Dec. 1, 1942.  E. V. J. TOWER  2,304,039
CLUTCH PLATE
Filed March 11, 1941
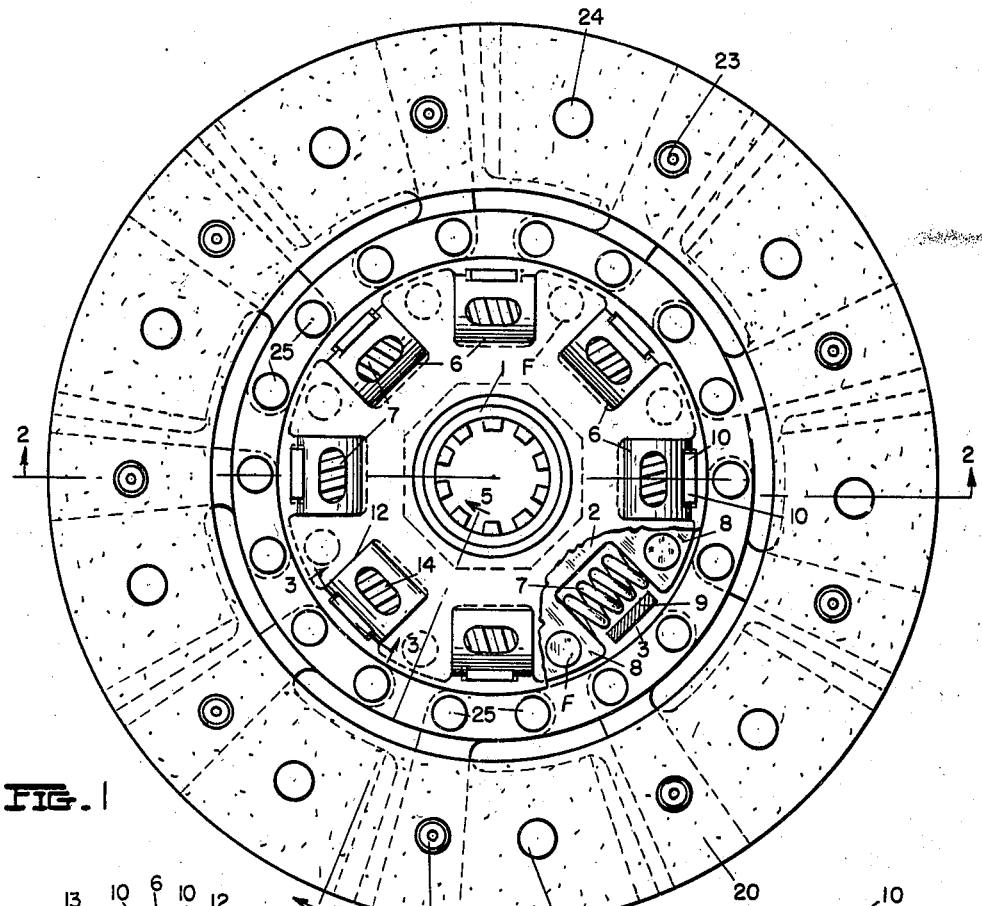
FIG. 1
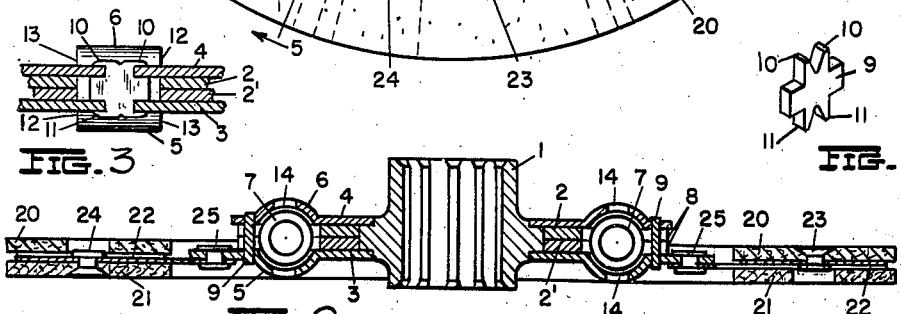
FIG. 3  FIG. 4
FIG. 2
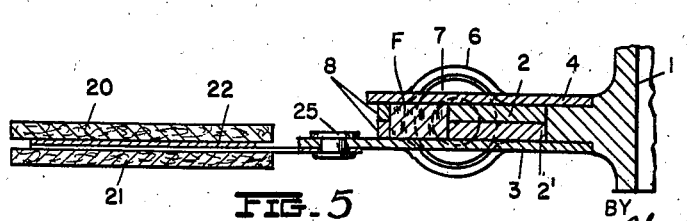
FIG. 5
INVENTOR.
ELMER V. J. TOWER
BY Oberlin, Limbach & Day
ATTORNEYS Patented Dec. 1, 1942

2,304,039

UNITED STATES PATENT OFFICE 2,304,039

CLUTCH PLATE

Elmer V. J. Tower, Grand Ledge, Mich., assignor to Accurate Parts Mfg. Co., Cleveland, Ohio, a corporation of Ohio Application March 11, 1941, Serial No. 382,748

9 Claims. (Cl. 192—68)

The present invention relates to the driven member or clutch plate of an automotive clutch assembly. The structural design of such clutch plates are necessarily limited, first, by the amount of weight that can be incorporated into them, since their inertia or "spinning weight" must be minimized for the satisfactory operation of the clutch; and secondly, both the radial and axial dimensions of the clutch plate are limited because of the corresponding available space in associated parts of the clutch assembly, such as the pressure plate and fly-wheel.

In addition to these general structural limitations in a clutch plate, it is also desired to provide certain shock-absorbing devices therein. Thus, one of the shock-absorbing devices usually comprises a yieldable mounting between the hub and disk body of the plate to cushion the torque or driving force transmitted therethrough by permitting yieldable movement between the hub and the disk. Furthermore, it is desirable to provide means for cooling spring elements which are subject to deterioration in their original spring pressure or "weight" when subjected to heat such as that generated by friction.

It is, therefore, the object and nature of the present invention to provide an improved construction of clutch plate accommodating these last-mentioned functions in an entirely satisfactory manner, and at the same time, maintaining the structural parts within the confines of permissible dimensional limitations.

When shock-absorbing means, such as coil springs, cantilever springs, laminated springs or rubber elements, are provided for absorbing the torque transmitted between the hub and the disk of the clutch plate, it is usually necessary to provide a side cover plate carried by the disk body and overlying a flanged element on the hub. One of the objects of the invention is to provide an improved fastening means for mounting such a side cover plate to the disk body. Briefly, such fastening means comprise rectangular or oblong, block-shaped elements occupying the space between the side plate and the disk and secured thereto, preferably in the fashion of a rivet. This improved fastening construction performs several novel and advantageous functions. First, it provides a surface-to-surface contact for abutting elements such as the spokes or spring-confining walls of the hub flange. Secondly, it provides closer and more uniform axial alignment between the side plate and the disk. Thirdly, due to the relatively large amount of shoulder area provided in a circumferential direction, the oblong, block-shaped fastening elements of the invention eliminate the tilting or rocking effect heretofore encountered where ordinary round rivets have been employed. Fourthly, this new construction, has the dual function of a side plate fastening device and also serving as a portion of the axial wall of the side plate, thus permitting both a saving in material required for the side plate fabrication and in reduction in the "spinning weight."

My invention is also particularly adapted to that particular type of clutch plate in which the friction facings are attached to the plate or to the disk body by means of separate segmental or similar friction facing supporting members which require a space upon the outer marginal portion of the disk body for anchorage or attachment thereto. By reason of the restriction of the outward diametral extent of the side plate, as achieved by my invention, the provision of this necessary outer marginal portion on the disk body for the attachment of the separate facing ring supporting members, is rendered possible, and without sacrificing the strength or rigid mounting of the side plate upon the disk body.

Another object of the invention is to provide means for circulating cooling air through the space enclosed by the side cover plate.

To the accomplishment of the foregoing and related ends, said invention, then, consists of the means hereinafter fully described and particularly pointed out in the claims; the annexed drawing and the following description setting forth in detail certain structure embodying the invention, such disclosed means constituting, however, but one of various structural forms in which the principle of the invention may be used.

In said annexed drawing—

Fig. 1 is a plan view, with portions broken away, of a clutch plate embodying the construction of the invention; Fig. 2 is a mid-sectional view of Fig. 1; Fig. 3 is a detailed sectional view taken substantially along line 3—3 of Fig. 1 and in the direction of the arrows; Fig. 4 is a perspective view of one of the oblong, block-shaped rivets employed for fastening the side cover plate to the disk body; and Fig. 5 is an enlarged, detailed sectional view, taken along the line 5—5 of Fig. 1 and in the direction of the arrows.

Now referring more particularly to the drawing, there is shown therein a splined hub 1 having the outwardly extending flange in the form of the laminated elements 2 and 2', which are enclosed on both sides by the disk body 3 and the side cover plate 4. The flange elements 2 and 2', carrying the friction inserts F, are separately fabricated and permanently attached to the hub 1, but such construction does not constitute part of the present invention, being described in further detail and claimed in my copending application Serial No. 373,014, filed January 3, 1941, now U. S. Patent No. 2,294,638.

The disk 3 and cover plate 4 have deformations or sumps 5 and 6, respectively, therein, in which the coil compression springs 7 are received. The ends of the coil springs 7 are also received in openings or spaces between the radially extending arms or spokes 8 of the hub flange. The hub 1 is thus movably or rotatably mounted with respect to the disk 3 and such movement is yieldably received by the coil springs 7.

The side plate 4 is attached, adjacent its outer periphery to the disk 3 by means of the rectangular or oblong, block-shaped rivets 9. Fig. 4 shows one of the rivets 9 before its assembly in fastened position. The tangs or prongs 10 and 11 extend from opposite sides of the long dimension of the oblong rivets and are inserted in rectangular-shaped openings in the disk 3 and cover plate 4, respectively, and are then bent over and flattened out in the position as best shown in Fig. 3, thus firmly and permanently securing the elements together. It will be seen that the long dimension of the oblong rivets 9 is disposed parallel to the longitudinal axis of the spring 7 and located adjacent thereto, thus forming an enclosing housing for the latter. Furthermore, it will be seen that the long dimension or longer side of the oblong rivets 9 is slighty shorter than the width of the space between the spokes 8. Thus, the shorter sides of the rivets 9 function as limit stops bearing against the spokes 8 and thereby producing an ample, firm, surface-to-surface contact, not likely to become distorted or "hammered out" on repeated contact. Furthermore, it will be seen that the oblong rivets 9 provide a substantial bearing surface for the disk 3 and side plate 4, so that when the latter are assembled with the rivets 9, a uniform, aligned spacing distance between the disk 3 and plate 4 will be provided and maintained. This latter additional bearing surface further counteracts any rocking or oscillating movement in a circumferential direction between the disk 3 and plate 4.

Openings or vents 12 and 13 are provided between the sumps 5 and 6, respectively, and the disk body 3 and plate 4 for the induction of air to the space between the disk 3 and plate 4 and in which the coil springs 7 are enclosed. Additional openings 14 are provided in the longitudinal walls of the sumps 5 and 6 and they also permit the induction of air, as well as serving as means for permitting visual inspection of the condition of the coil springs 7. It will be noted that the radially outer margin of the side plate 4 terminates just beyond the oblong rivets 9, leaving alternate open spaces circumferentially between the latter. Thus, upon rotation of the clutch plate, a centrifugal or sirocco fan effect is created and cooling air is drawn in through the openings 12, 13 and 14 and out through the spaces between the oblong rivets 9.

Heretofore, in order to secure the side plate to the disk body with sufficient strength and rigidity, it has been found necessary to impart an axially extending wall and radial flange to its outer periphery, so that the latter flange could be riveted directly to the disk body. However, since the above-described construction for securing the side plate to the disk possesses ample rigidity and strength, this additional material and weight heretofore required in the side plate can be eliminated. Furthermore, such elimination renders available the additional outer marginal space on the disk 3 for the anchorage of the separate cushion segments, which latter construction shall now be described.

The friction facing rings 20 and 21 are mounted upon each side of the clutch plate and are attached to the separate cushion segments 22 by means of the rivets 23 and 24 respectively. The cushion segments in turn are attached to the outer marginal periphery of the disk 3 by means of the rivets 25.

Other modes of applying the principle of my invention may be empolyed instead of the one explained, change being made as regards the structure herein disclosed, provided the means stated by any of the following claims or the equivalent of such stated means be employed.

I, therefore, particularly point out and distinctly claim as my invention:

1. In a clutch plate assembly having a disk body and a side cover plate disposed in spaced parallel relationship thereto, the combination of fastening means for attaching said cover plate to said disk body, comprising a plurality of rigid, oblong, block-shaped members mounted between and laterally secured to said cover plate and to said disk body.

2. In a clutch plate assembly having a disk body and a side cover plate disposed in spaced parallel relationship thereto, the combination of fastening means for attaching said cover plate to said disk body, said means having a body portion of rectangular cross-section occupying such space and contacting the opposed surfaces of said clutch plate and disk body, and laterally extending reduced portions extending through said clutch plate and disk body and being secured thereto.

3. In a clutch plate assembly having a disk body and a side cover plate disposed in spaced parallel relationship thereto, the combination of fastening means for attaching said cover plate to said disk body, said means having a body portion of rectangular cross-section occupying such space and contacting the opposed surfaces of said clutch plate and disk body, and deformed tangs extending laterally from said body portion and adapted to be bent over against the outer surfaces of said clutch plate and of said disk body, the latter having openings for the passage therethrough of said tangs.

4. In a clutch plate assembly having a disk body, a side cover plate disposed parallel thereto and with its outer periphery spaced therefrom, the combination of a plurality of rigid, oblong, block-shaped fasteners secured to said disk body and to said cover plate, said fasteners being located adjacent said outer periphery and circumferentially spaced from each other.

5. A clutch plate assembly comprising a disk, a hub movably mounted with respect thereto, a flange on said hub overlying said disk, a cover plate for said flange disposed on the opposite side thereof to that of said disk, coil springs mounted in openings in said flange, and rigid, oblong, block-shaped fasteners secured to said disk and to said cover plate, said fasteners being located in radial alignment with said coil springs.

6. A clutch plate assembly comprising a disk, a hub movably mounted with respect thereto, a flange on said hub overlying said disk, a cover plate for said flange disposed on the opposite side thereof to that of said disk, coil springs mounted in openings in said flange, and oblong, block-shaped fasteners secured to said disk and to said cover plate, said fasteners being located in radial alignment with said coil springs and having their longer sides parallel thereto, the shorter sides of said fasteners being adapted to be contacted by the walls of said openings on movement of said outer flange with respect to said disk.

7. A clutch plate assembly comprising a disk, a hub movably mounted with respect thereto, a flange on said hub overlying said disk, a cover plate for said flange disposed on the opposite side thereof to that of said disk and with its outer periphery terminating short of the outer periphery of said disk and providing an open space therebetween, depressed portions in said disk and in said cover plate, and openings in said flange, coil springs adapted to be received in said depressed portions and in said openings, air vents in said depressed portions, a plurality of oblong, block-shaped fasteners secured to said disk and to said cover plate, said fasteners being circumferentially spaced from each other and from the radial sides of said openings in said flange, whereby on rotation of said clutch plate, air is adapted to be inducted through said vents and expelled through the spaces between said fasteners.

8. A clutch plate assembly comprising a disk, a hub movably mounted with respect thereto, a flange on said hub overlying said disk, a cover plate for said flange disposed on the opposite side thereof to that of said disk, radially extending arms on said flange, depressed portions in said disc and in said cover plate, coil springs mounted between said arms and received in said depressed portions, and oblong, block-shaped fasteners secured to said disk and to said cover plate at points intermediate said arms, said fasteners having their longer sides parallel to the long axis of said springs, such longer sides being slightly shorter than the width between said arms whereby the shorter ends of said fasteners are adapted to be contacted by said arms on movement of said hub and flange with respect to said disk.

9. A clutch plate assembly comprising a disk, a hub movably mounted with respect thereto, a flange on said hub overlying said disk, a cover plate for said flange disposed on the opposite side thereof to that of said disk, coil springs mounted between said disc, said cover plate and said flange friction facing rings, a plurality of separate supporting members carrying said facing rings and having their radially inner ends attached to the outer margin of said disk, the outer periphery of said cover plate terminating short of such point of attachment, and oblong, block-shaped fasteners secured to said disk and to said cover plate and having their longer sides disposed in a substantially circumferential direction, said fasteners being located in radial adignment with said springs.

ELMER V. J. TOWER.